UNITED STATES PATENT OFFICE.

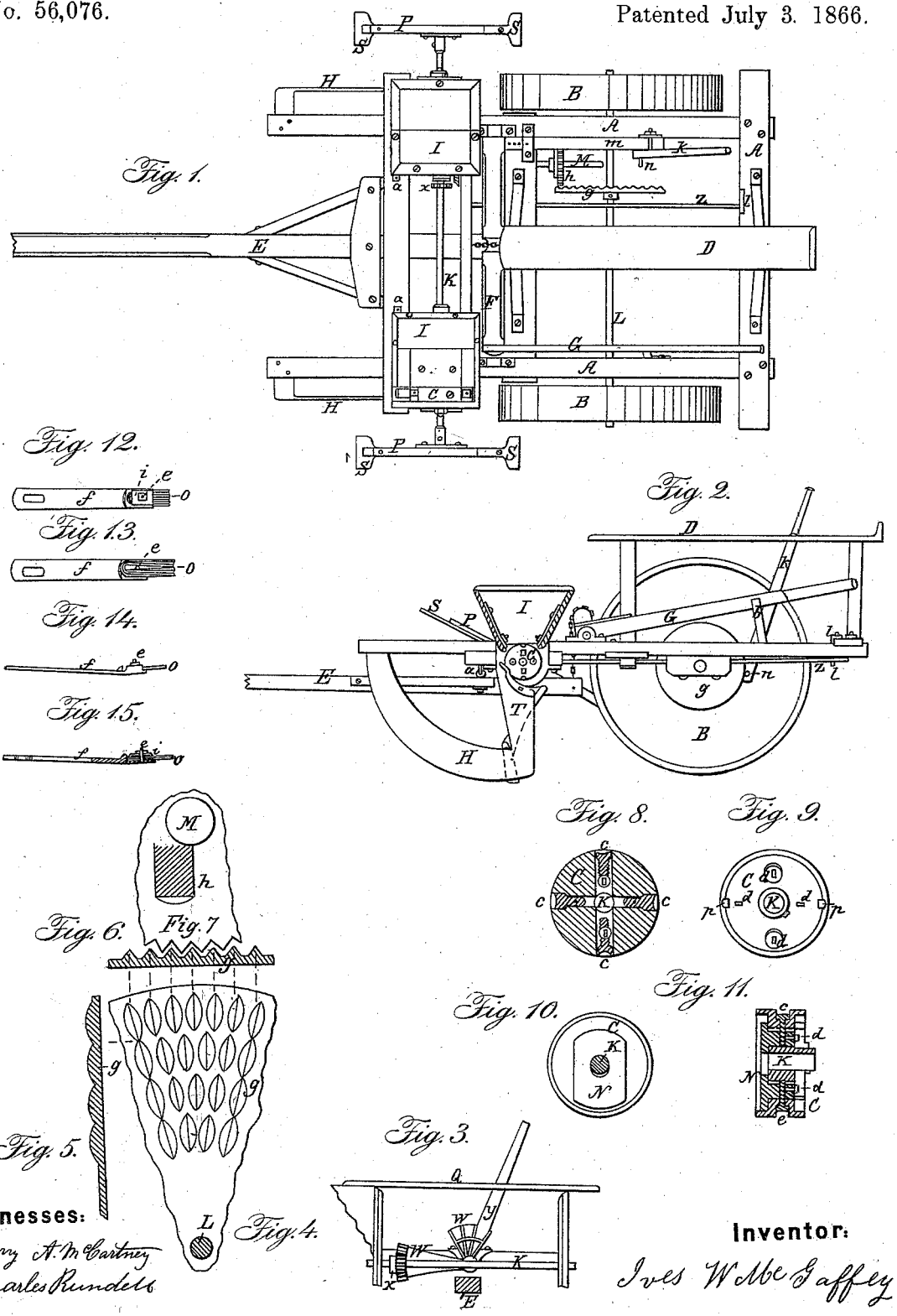

IVES W. McGAFFEY, OF CHICAGO, ILLINOIS.

IMPROVEMENT IN SEED-PLANTERS.

Specification forming part of Letters Patent No. 56,076, dated July 3, 1866.

*To all whom it may concern:*

Be it known that I, IVES W. McGAFFEY, of Chicago, in the county of Cook and State of Illinois, have invented new and useful Improvements in Seed-Planting Machines; and I do hereby declare that the following is a full and exact description thereof, reference being had to the accompanying drawings, which form a part of this specification, and to the letters of reference marked thereon, in which—

Figure 1 is a plan top view. Fig. 2 is a side elevation. Fig. 3 is a partial front view, showing the hand-operating device. Fig. 4 is a portion of the face-plate, showing the form and arrangement of the teeth. Fig. 5 is a cross-section of face-plate through a line of teeth. Fig. 6 is a section across the teeth. Fig. 7 is a section of side view of pinion. Fig. 8 is a side sectional view of the cylinder. Fig. 9 is an outside view of the cylinder. Fig. 10 is an inside view, showing the shifting slide of cylinder. Fig. 11 is a cross-section, showing screws and set-screws. Figs. 12 and 13 are top views of the brush with and without the cap. Figs. 14 and 15 are side and sectional views of the brush.

A represents the frame-work, which is supported on two wheels or rollers, B, one at each side of the frame-work. A seat, D, is fixed upon the frame-work for the driver and operator to ride upon. The tongue E is attached to the front cross-bar of the frame by eyebolts $a$, which allow the tongue E to move freely up or down.

The rear end of the tongue extends backward from the point of attachment, and is connected to a roller, F, which is fixed on the upper side of the frame, and is operated by a lever, G, the object of which is to raise the front of the frame-work and runners H from the ground for turning at the end of the rows or driving from place to place, which is accomplished by drawing the lever back under the catch $b$. Colters or runners H are attached to the front of the frame A in front of the wheels B, having a thin and sharp edge in front, and curved upward, so as to run over or cut through trash or clods, and widening out at their rear ends, so as to open a furrow for the seed to drop into.

The lower ends of the seed-tubes T are fastened into the runners H and the upper end attached to the frame-work above, and extend around the seed-distributing cylinders C to the seed-boxes I above, and support the same. These cylinders C are fixed on shaft K, which extends across the frame A in front, and operated, when used automatically, by one of the wheels B, which is fast on the main shaft L, and connected to the front shaft, K, by a cross-shaft, M.

The dropping-cylinders C have four holes or cups in their periphery for receiving and discharging the seed. Into these cups screws $c\ c\ c\ c$ are fitted, the heads of which are nearly the same diameter as the cups, and serve to adjust the cups so as to measure and discharge the desired quantity of seed by turning them up or down.

Great difficulty has been experienced in using cylinders of this kind in which screws have been used in the cups to regulate the quantity of seed, as heretofore constructed, for if the screws were made to fit closely they would soon become immovable from rust or other causes and fail to answer the purpose designed; and if loosely fitted they will not stay as adjusted, but are liable to work out by the shaking and working of the machine, and are unsafe and unreliable.

To overcome these difficulties I fix set-screws $d\ d\ d\ d$ into the sides of the cylinders C, so that their points will press against the screws in the seed-cups, as shown in Figs. 8, 9, 10, and 11. By this means both the screws in the cups and the set-screws may be loosely fitted, so as not to be liable to get stuck fast, and securely fastened to any adjustment desired by turning the set-screws against the others. In hill or check-row planting but two of the cups are used in each of the cylinders. The screws in the other cups are to be turned up even with the surface of the cylinder.

The screws in the two cups used for hill-planting must be turned down until the cups are of sufficient depth, so that each cup will measure the quantity of seed desired for a hill. To prevent the seed from clogging or sticking fast in these two cups, in which the screws have to be turned deep down for hill-planting, I have provided a shifting slide, N, Figs. 8, 9, 10, 11, which is made to project through the side of the cylinder under the seed-cups, so that the screws $c$ in the seed-cups and the set-screws $d$ for holding the same in place are fitted into and move with the slide, which is of sufficient weight to oscillate as the cylinder revolves and force the seed from the cups as they come around to the under side and into the seed-tube T. The screw in the cup on the opposite side is drawn down at the same time, so as to receive a charge of seed from the bottom of the seed-box I.

Brushes O are fixed into the seed-boxes at each side close to the cylinder, for striking the seed from each cup as it passes out of the seed-box.

The use of the brush O as a cut-off for the seed-cups is well known, and preferable to other devices while in order; but it has in many cases been abandoned on account of its liability to get out of order and wear out. I have sought to overcome this objection by constructing my brush so that the bristles can easily be replaced when worn out. I use a metallic shank or stock, $f$, Figs. 12, 13, 14, 15, with a jaw at one end to receive the bristles, which are laid in it in the form of a loop, the ends extending beyond the jaw the length desired for the brush O. A smaller bolt, $e$, passes through the jaw, then through the loop in the bristles and through a cap, $i$, which is fitted to the jaw. This cap is pressed into the jaw onto the bristles, and holds them secure by the nut on the bolt $e$. The brush-shank $f$ is slotted at its upper end to allow its adjustment to the cylinders.

The seed-boxes have a partition at the end near the cylinders, which prevents too great a pressure of seed upon the cylinders and brushes, the seed passing under said partition to the cylinder.

The seed-tubes T are provided with a second drop or catch valve, V, which catches the seed near the ground as it is discharged from the cylinders C. These valves V are opened at proper intervals by pins $p\ p$, which project from the side of the cylinders and strike against the curved arms of said valves, as shown in Fig. 2. The purpose of these valves is to prevent the seed from scattering and to insure greater accuracy in check-row planting. These valves are pivoted on bolts, which pass through the seed-tubes directly beneath the cylinders, and are so constructed and balanced as to keep closed by their own weight, except when opened by the pins in the cylinders.

At the ends of the front shaft, K, are fixed cross-bars P, both ends projecting at right angles with the shaft and long enough to reach to the ground when the shaft revolves. At the ends of these cross-bars P blades S S are fixed, resembling shovels, made sharp, so as to cut trash or clods and make a mark in the ground, the operation and purpose of which will be more fully described hereinafter in connection with the adjustable cog-gears.

The front end of cross-shaft M is connected with the front shaft, K, by a common bevel or miter gear, and the rear end is connected with the main shaft L by a peculiar adjustable cog-gear, which consists of a face-plate, $g$, which drives the pinion $h$.

The face-plate $g$ has a series or row of teeth or projections of an oblong conical form, as shown in Figs. 4 and 5. These teeth are pointed to and from the center of the face-plate, and so arranged that the pinion may be moved freely from the inner to the outer circle while the machine is in motion and without slipping out of gear, and so arranged that the face-plate $g$ will drive the pinion $h$ at any point on its surface, whether exactly on one of the rows of teeth or between two of them, thereby increasing or diminishing the motion as the pinion is moved to or from the center of the face-plate.

The teeth on the pinion-wheel $h$ are of the same size as those on the face-plate $g$, as shown in Figs. 5, 6, and 7.

The pinion $h$ is moved on the face-plate by the lever $k$, which is connected with the sliding bar $m$ by rod $n$. The pinion $h$ is shipped in or out of gear by spring-rod Z, which connects with the journal-box of the cross-shaft M. Catch $l$ on the cross-bar holds the spring in place when the pinion $h$ is shipped in or out of gear.

A spur or cutter, $r$, is fastened into the opening at the heel of the runner in front of the seed-tube T, and fastened by a wedge or other means. The object of this cutter is to open a small gash for the seed on prairie-sod or other soil too hard for the runner itself to penetrate.

I am aware that runners have been used in which the cutting-blade has extended below the heel for the same purpose; but such construction is objectionable for planting on soft ground, for this projection makes a small gash in the center of the bottom of the furrow, into which most of the seed will fall and remain close together, while it is desirable the seed should be scattered the whole width of the furrow.

In automatic check-row planting the operation is as follows: Having fixed the markers P on the shaft K in line parallel with each other and set the cylinder C so that both valves will be opened at the same time and the seed dropped in line with the marks made by the marking-blades S at each side of the machine, the operator mounts the seat and takes the regulating-lever $k$ in hand and sets the pinion on the face-plate at such a distance from the center as will give the required motion to the front shaft and seeding device to drop the hills the required distance apart. The machine is driven across the field to be planted, the pinion $h$ being held to one position the first time across, when it will be found the hills are spaced nearly equidistant, and the position of the hills indicated by the marks made by the blades S at each side of the machine, and the marks and hills in line with each other.

In the return and succeeding rows the motion of the front shaft, K, must be controlled and regulated by the operator so that the markers shall strike the ground in the same place, or in line with those previously made. These markers extend from the side of the machine to nearly or quite half of the distance between the rows, so that in the return the markers will nearly or quite reach into the marks previously made, so the operator can readily see when they are coming in line and make the necessary change of the gear to keep them in line. If, from the unevenness of the surface, or if because the driving-wheel comes in contact with clods or obstructions, the markers S are overreaching or coming down beyond the marks in the previously-made rows, the operator draws back the hand-lever $k$, which will give the markers and cylinders faster motion and drop and mark the hills closer together, and by moving the lever forward the space between the hills will be increased. So by moving the lever $k$ backward or forward, as occasion may require, which may be determined by watching the revolving markers, the operator is enabled to keep the machine all the time dropping the seed and marking in line with the hills first planted, thereby forming what is termed "check-rowing," so that the hills can be cultivated on four sides.

In planting on land that is very rough, so as to make it difficult to see the marks made by the machine, it is advisable to first mark the field off one way by a sled or marking-machine such as is commonly used for this purpose in hand-planting. In this case the machine is driven across the marks at right angles, and the markers on the machine are then used only as pointers to indicate where the seed is dropping, and must be so governed as to strike into each of the previously-made marks as the machine passes over them by moving the hand-lever $k$ back or forward, as described above.

As this machine is materially different as an automatic check-row planter from those heretofore used, a portion of the farmers have not the mechanical ability to operate it properly and understandingly without personal instructions, and as it is not always convenient to instruct the farmer in the first operation, therefore to guard against a failure in such cases, or from the gears getting broken or out of repair, I have provided a means by which the seeding device may be operated by a hand-lever similar to others in common use, which the farmers generally understand. This device is represented in Fig. 13. A small bevel-gear, X, is fixed on the seeding-shaft K. This gear is worked by the segment of a larger gear, which is pivoted upon a plate, W', on the end of an arm of plate W, secured to the cross-bar by means of bolts or screws in rear of the dropping-shaft K. This segment has two sockets extending upward from the hub at an angle, one to the right and one to the left of the perpendicular, and of proper size to receive the lower end of the hand-lever $y$. The operator sits upon a seat which rests upon the seed-boxes I I, extending from one to the other. By having the sockets diverging from the perpendicular the operator can sit in the center of the seat and face to the right or left by inserting the lever into the right or left socket. By moving this hand-lever $y$ to the right or left the seeding-shaft is turned half a revolution forward or backward, and drops a charge of seed both in its forward and backward motion at each vibration of the hand-lever $y$.

In operating by this device the pointers or markers are removed and the gearing taken off or the cross-shaft shipped out of gear. The field to be planted is then first marked off one way and the machine driven across these marks, and the operator moves the hand-lever at the intersection of each of the previously-made marks.

This machine is also intended to be used for drilling or scattering the seed in rows, in which operation the segment-gear is removed and the cross-shaft and gearing are used.

In drilling, all four of the cups are used in the cylinders, the quantity of seed being regulated by adjusting the screws in the cups, as hereinbefore described, and by setting the pinion $h$ on the face-plate $g$ in such position as to give the seeding device the proper motion. The pinion $h$ is then fastened so it will not move on the face-plate by inserting a pin into the hole through the clasp $o$ into corresponding holes in the sliding bar $m$.

In drilling, the valves in the seed-tubes T are fastened open or removed, so the seed may drop directly from the cylinders to the ground.

A small hole is drilled into the heads of the screws in the seed-cup for dropping small seeds, such as broom-corn or sorghum.

What I claim, and desire to secure by Letters Patent, is—

1. The seed-distributing cylinder having holes or cups in its periphery, with screws fitted into the cups for adjusting their capacity, and set-screws at the side to hold them in place when adjusted, in connection with the shifting slide N, constructed and operated in the manner and for the purpose substantially as specified.

2. The adjustable cog or tooth gears $g$ and $h$, for regulating and controlling the seeding device while the machine is moving over the field, constructed and operated substantially as and for the purpose specified.

3. In combination with the adjustable toothed or cog gear $g$ and $h$ and seeding device, a revolving pointer or marker, P, for marking or indicating the position of the hills in automatic check-row planting.

4. Constructing a brush for seed-planting machines with cap, bolt, and nut for holding the bristles in the manner specified or its equivalent.

5. The detachable spur or rod-cutter $r$, fitted to the heel of the runner in the manner and for the purpose specified.

6. The oscillating plate W, provided with the socket for the lever $y$, and having the arm W', provided with the segmental rack, arranged to operate in combination with the pinion $x$ on shaft K, substantially as and for the purpose set forth.

IVES W. McGAFFEY.

Witnesses:
HENRY F. McCARTNEY,
CHARLES RUNDELL.